(12) United States Patent
Kiyose et al.

(10) Patent No.: US 8,772,703 B2
(45) Date of Patent: Jul. 8, 2014

(54) POSITION DETECTION SYSTEM AND PROJECTION DISPLAY SYSTEM

(75) Inventors: Kanechika Kiyose, Matsumoto (JP); Kogo Endo, Chino (JP)

(73) Assignee: Seiko Epson Corporation (JP)

( * ) Notice: Subject to any disclaimer, the term of this patent is extended or adjusted under 35 U.S.C. 154(b) by 295 days.

(21) Appl. No.: 13/417,627

(22) Filed: Mar. 12, 2012

(65) Prior Publication Data

US 2012/0235019 A1 Sep. 20, 2012

(30) Foreign Application Priority Data

Mar. 14, 2011 (JP) ................................. 2011-055185

(51) Int. Cl.
*G01C 21/00* (2006.01)

(52) U.S. Cl.
USPC .......................... 250/221; 250/206.1; 345/175

(58) Field of Classification Search
USPC ................ 250/206.1, 206.2, 216, 221, 222.1; 345/157, 173, 175, 179, 180; 356/614
See application file for complete search history.

(56) References Cited

U.S. PATENT DOCUMENTS

| 5,666,037 A | 9/1997 | Reime |
| 5,726,547 A | 3/1998 | Reime |
| 6,927,384 B2 | 8/2005 | Reime et al. |
| 2012/0212454 A1* | 8/2012 | Kiyose ......................... 345/175 |
| 2013/0002535 A1* | 1/2013 | Onishi et al. .................. 345/156 |

FOREIGN PATENT DOCUMENTS

| JP | 2005-346231 | 12/2005 |
| JP | 2011-122869 | 6/2011 |

* cited by examiner

*Primary Examiner* — Kevin Pyo
(74) *Attorney, Agent, or Firm* — Harness, Dickey & Pierce, P.L.C.

(57) ABSTRACT

An optical position detection system includes a light output unit that outputs lights toward a first detection target and a second detection target, and a first light receiving unit that receives a first reflected light from the first detection target and a second light receiving unit that receives a second reflected light from the second detection target having different wavelengths, wherein the first detection target has a first reflection filter that reflects the first reflected light and the second detection target has a second reflection filter that reflects the second reflected light.

12 Claims, 11 Drawing Sheets

POSITION DETECTION SYSTEM AND PROJECTION DISPLAY SYSTEM

BACKGROUND

1. Technical Field

The present invention relates to a position detection system that optically detects a position of a detection target and a projection display system.

2. Related Art

In the past, position detection systems like touch panels have been used for electronic devices with display screen such as cellular phones, car navigation systems, automated ticket vending machines, and automated teller machines. The position detection system is provided at the visual recognition side of the display screen and detects a position of a detection target like a pen or a finger by placing the detection target on the display screen while referring to an image on the display screen. For example, they are disclosed in Patent Document 1 (U.S. Pat. No. 5,666,037) and Patent Document 2 (U.S. Pat. No. 6,927,384).

The position detection systems disclosed in Patent Document 1 and Patent Document 2 are optical systems, and each has a detection space set on a reference surface of a body surface and includes a light source and a light detection unit. When a detection target is placed in an arbitrary position within the detection space, the light of the light source is reflected on the surface of the detection target and a part of the reflected light is received by the light detection unit, and thereby, the position of the detection target is detected.

However, in the position detection systems disclosed in Patent Document 1 and Patent Document 2, if two detection targets are placed at the same time within the detection space, the light detection unit may not respectively distinguish the reflected lights of the two detection targets, but may detect the intermediate position between the two detection targets. Accordingly, there has been a problem that it may be impossible to detect the respective positions of the two detection targets.

SUMMARY

An advantage of some aspects of the invention is to provide an optical position detection system that may detect respective positions of plural detection targets.

Application Example 1

This application example is directed to a position detection system including a light output unit that outputs lights toward a first detection target and a second detection target, a light receiving unit that receives lights reflected from the first detection target and the second detection target, and a position detection unit that detects positions of the first detection target and the second detection target using the lights received by the light receiving unit, wherein the first detection target has a first reflection filter that reflects a first reflected light and the second detection target has a second reflection filter that reflects a second reflected light having a different wavelength from that of the first reflected light, and the light receiving unit has a first light receiving unit that detects the first reflected light and a second light receiving unit that detects the second reflected light by distinguishing wavelengths of the lights.

According to the application example, the light output unit outputs lights toward the first detection target and the second detection target. The first detection target has the first reflection filter that reflects the first reflected light and the second detection target has the second reflection filter that reflects the second reflected light having the different wavelength from that of the first reflected light. Thereby, the first reflected light and the second reflected light are lights having different wavelengths.

Further, the first reflected light of the lights output from the light output unit is reflected by the first detection target. Then, the first receiving unit distinguishes the wavelength of the reflected light and receives the first reflected light. Thereby, the position of the first detection target can be detected by the position detection unit. Similarly, the second reflected light of the lights output from the light output unit is reflected by the second detection target. Then, the second receiving unit distinguishes the wavelength of the reflected light and receives the second reflected light. Thereby, the position of the second detection target can be detected by the position detection unit. Therefore, the optical position detection system may respectively distinguish and detects the position of the first detection target and the position of the second detection target.

Application Example 2

In the position detection system according to the application example, it is preferable that the first reflection filter and the second reflection filter each has a frequency filter and a retroreflector that reflects incident light in an opposite direction to an incident direction.

According to this application example, the first reflected light to be reflected by the first detection target and the second reflected light to be reflected by the second detection target may distinctly be set at different frequencies by the frequency filters. Further, since the retroreflector reflects the reflected light in a predetermined direction, the reflected light for detection of the position may efficiently be received. Therefore, the positions of the plural detection targets may be accurately detected.

Application Example 3

In the position detection system according to the application example, it is preferable that the retroreflector has a prism shape.

According to this application example, the retroreflector has the prism shape. The prism shape is a shape having two sides at a right angle in the sectional shape. In this regard, the prism shape may efficiently and reliably bring incident light into reflected light in parallel in the opposite direction.

Application Example 4

In the position detection system according to the application example, it is preferable that the frequency filter is provided by coating or bonding on a surface of the retroreflector.

According to this application example, there is no air layer between the frequency filter and the retroreflector, and the lights from the light output unit are not deteriorated by interface reflection. As a result, the individual differences in reflectance due to manufacturing variations of the detection targets may be made smaller.

Application Example 5

In the position detection system according to the application example, it is preferable that the first light receiving unit and the second light receiving unit are provided in one photodetector.

According to this application example, the first light receiving unit and the second light receiving unit are provided in one photodetector. Accordingly, compared to the case where they are separately provided, the number of parts may be reduced. Furthermore, adjustment of the directions in which the first light receiving unit and the second light receiving unit receive lights may be made easier. Therefore, the difference in directionality between the light receiving units may be reduced and the influence on position information by the displacement of the detection positions may be reduced. As a result, the relative positions of the respective detection targets may be accurately detected without complicated processing.

Application Example 6

In the position detection system according to the application example, it is preferable that an angle formed by a line connecting the light output unit and the first detection target and a line connecting the photodetector and the first detection target is 10 degrees or less, and an angle formed by a line connecting the light output unit and the second detection target and a line connecting the photodetector and the second detection target is 10 degrees or less.

According to this application example, the angle formed by the line connecting the light output unit and the first detection target and the line connecting the photodetector and the first detection target is 10 degrees or less. Further, the angle formed by the line connecting the light output unit and the second detection target and the line connecting the photodetector and the second detection target is 10 degrees or less. Since the retroreflectors have the properties of reflecting incident light in parallel in the opposite direction, if the angles formed by the lines connecting the light output unit and the first detection target and the second detection target and the lines connecting the photodetector and the first detection target and the second detection target are more than 10 degrees, the amount of light received by the light receiving units becomes smaller and insufficient for position detection. In the application example, the photodetectors are provided in the locations where the reflected lights can be received. Therefore, the photodetectors may efficiently receive the lights formed by reflection of the lights from the light output unit by the first detection target and the second detection target.

Application Example 7

This application example is directed to a projection display system including the position detection system and an image irradiation system that projects an image on a reference surface.

The projection display system includes the image irradiation system that projects an image on the reference surface. Therefore, the image projected on the reference surface may be viewed. Further, the projection display system includes the optical position detection system. Therefore, a system combining an image and a function of detecting the first detection target and the second detection target may be constructed. In this case, the light output unit may be provided in the image irradiation system, or separately from the image irradiation system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Next, embodiments of an optical position detection system according to the invention will be explained with reference to the drawings. The following embodiments are application of the optical position detection system to a projection display system, however, the invention may be applied not only to the projection display system but also to various display systems and other various operation systems. Further, in the following respective drawings, the respective members are shown in recognizable sizes in different scaling relations from the real scaling relations of the respective members.

Embodiment 1

Overall Configuration of Position Detection System

Figure 1:
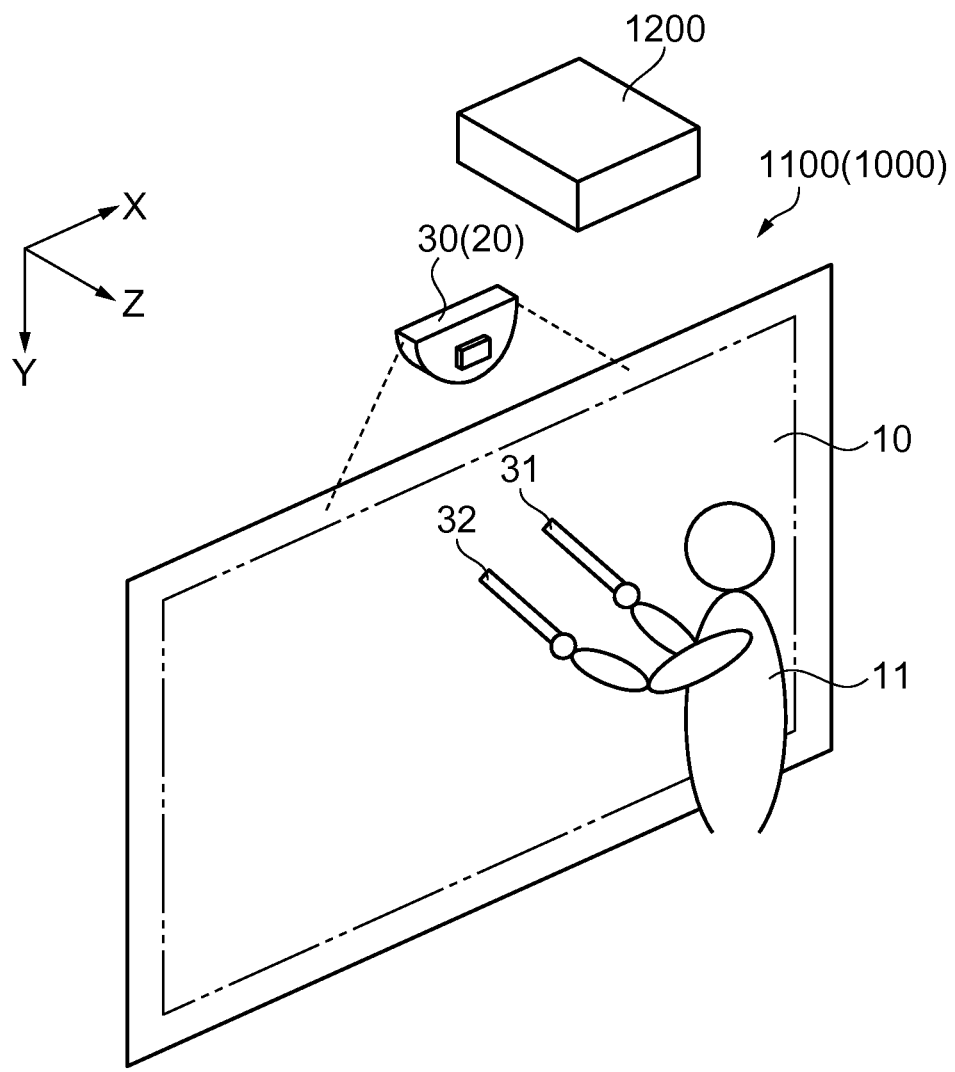
FIG. 1 is a schematic perspective view showing a configuration of a position detection system.
Figure 2:
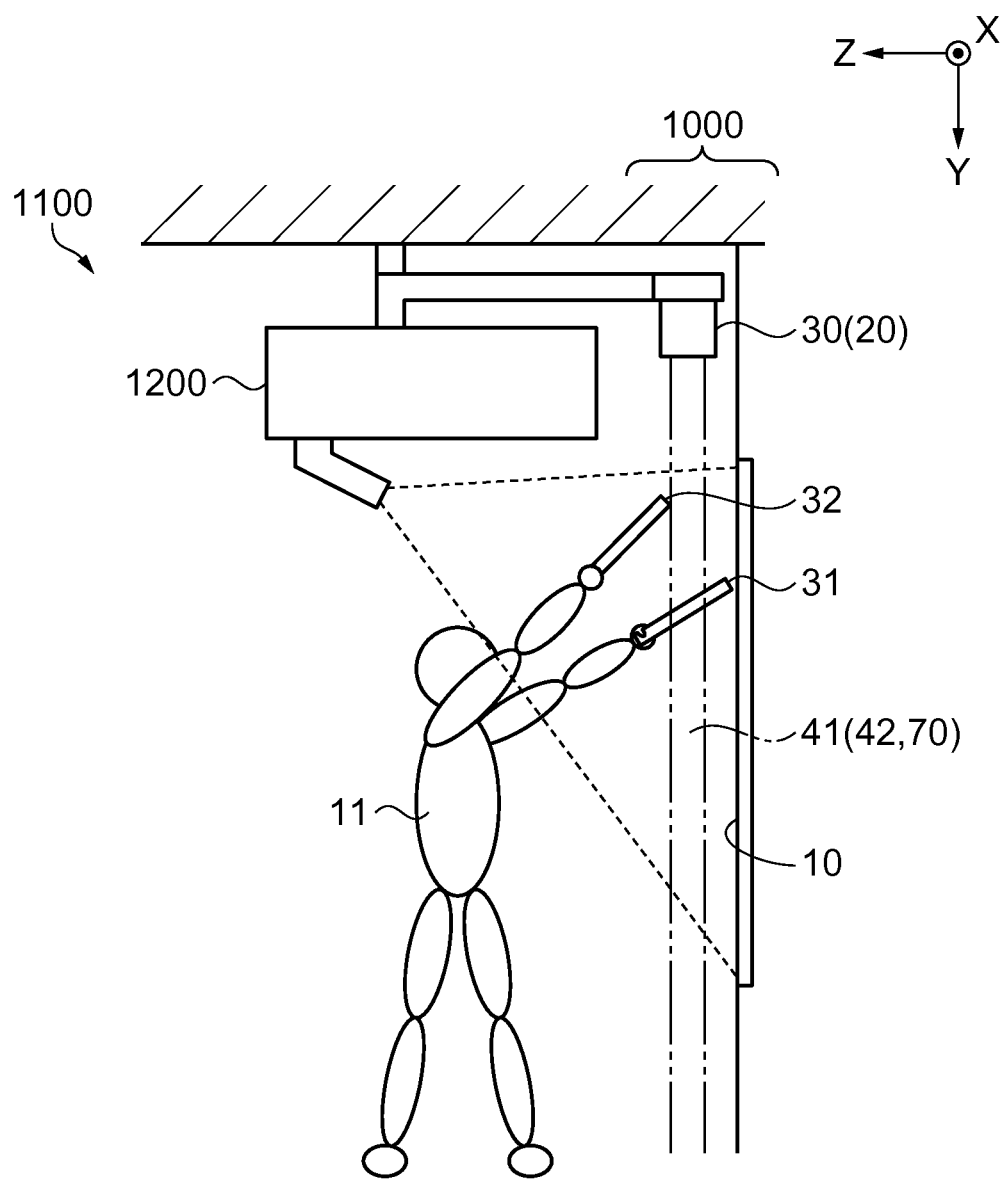
FIG. 2 is a schematic side view showing the configuration of the position detection system.
Figure 3:
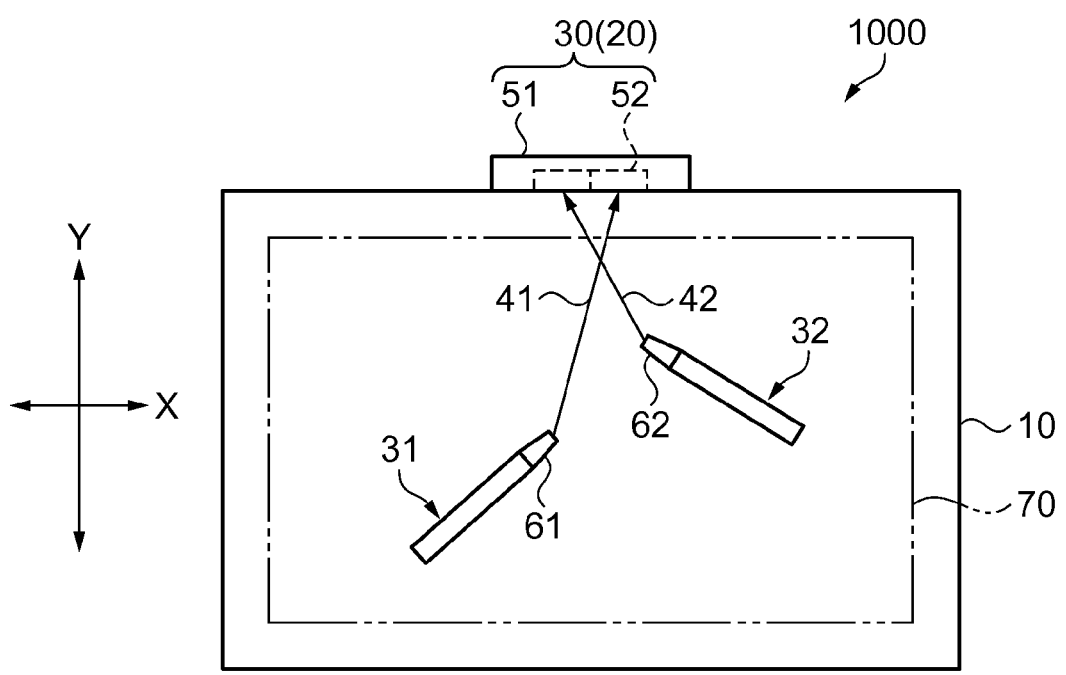
FIG. 3 is a schematic front view showing the configuration of the position detection system.

FIG. 1 is a schematic perspective view showing a configuration of a position detection system, and FIG. 2 is a schematic side view showing the configuration of the position detection system. FIG. 3 is a schematic front view showing the configuration of the position detection system. As shown in FIGS. 1 to 3, the position detection system 1000 according to the invention includes a first detection target 31 and a second detection target 32 as targets of position detection, and alight output unit 20 that outputs lights toward the first detection target 31 and the second detection target 32. The position detection system 1000 further includes a photodetector 30 as a position detection unit that receives respective reflected lights (a first reflected light 41 and a second reflected light 42) of the first detection target 31 and the second detection target 32. A projection display system 1100 includes the optical position detection system 1000 and an image irradiation system 1200 that projects an image on a reference surface.

Note that, for convenience of explanation, in FIGS. 1 to 3, the X-axis and Y-axis are set along the reference surface 10 and the Z-axis is set along the normal direction of the reference surface 10. These X-axis, Y-axis, and Z-axis intersect one another.

The image irradiation system 1200 projects an image on the reference surface 10. Thereby, when an operator 11 views the reference surface 10, the image projected on the reference surface 10 can be viewed. Further, the operator 11 grasps the first detection target 31 and the second detection target 32. The operator 11 designates specific locations of the projected images using the first detection target 31 and the second detection target 32. The light output unit 20 outputs lights into a detection space 70 set in parallel to the reference surface 10. Further, when the first detection target 31 and the second detection target 32 are located in the detection space 70, the first detection target 31 and the second detection target 32 are irradiated with the lights output by the light output unit 20.

As shown in FIG. 3, a first reflection filter 61 is provided on the first detection target 31. Further, the irradiated light reflected by the first reflection filter 61 is referred to as "first reflected light 41". A second reflection filter 62 is provided on the second detection target 32. Further, the irradiated light reflected by the second reflection filter 62 is referred to as "second reflected light 42". The first reflection filter 61 and the second reflection filter 62 have functions of reflecting lights having different wavelengths. Therefore, the first reflected light 41 and the second reflected light 42 have different wavelengths.

In the photodetector 30, a first light receiving unit 51 that detects the first reflected light 41 and a second light receiving unit 52 that detects the second reflected light 42 are provided. Accordingly, the photodetector 30 can distinguish and detect the first reflected light 41 and the second reflected light 42. Further, the first light receiving unit 51 and the second light receiving unit 52 are provided in one photodetector. Accordingly, compared to the case where they are separately provided, the number of parts may be reduced. Furthermore, adjustment of the directions in which the first light receiving unit 51 and the second light receiving unit receive lights may be made easier. Therefore, the difference in directionality between the light receiving units may be reduced and the influence on position information by the displacement of the detection positions may be reduced. As a result, the relative positions of the respective detection targets may be accurately detected without complicated processing.

Figure 4:
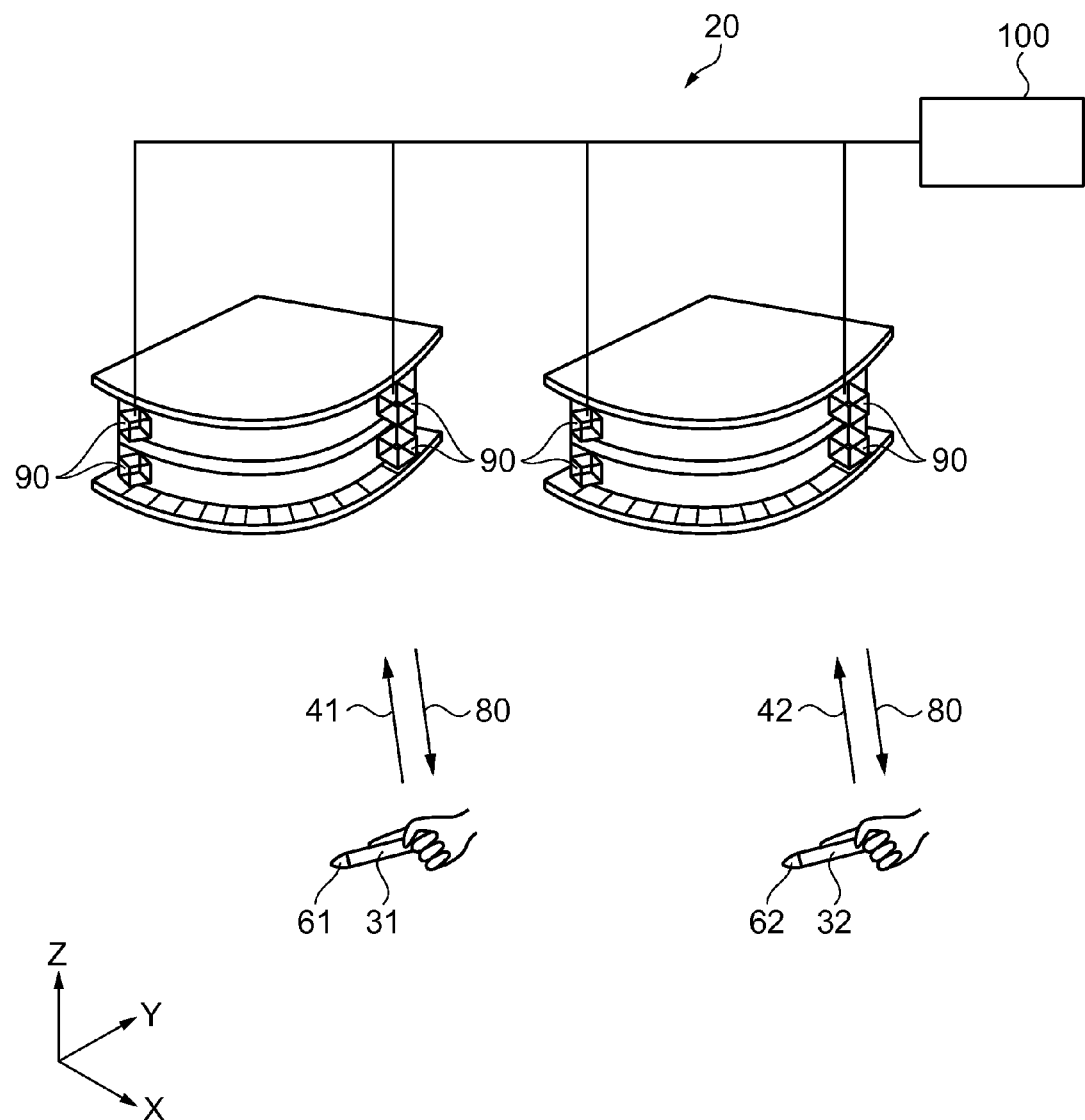
FIG. 4 is a schematic perspective view showing a configuration of a light output unit.

FIG. 4 is a schematic perspective view showing a configuration of the light output unit. As shown in FIG. 4, the light output unit 20 has plural light emitting devices 90 that output infrared lights and a light source drive unit 100 that drives the plural light emitting devices 90. The light emitting devices 90 are LEDs (light emitting diodes), for example, and position detection lights 80 are output from the plural light emitting devices 90. The light output unit 20 that outputs lights toward the first detection target 31 and the second detection target 32 forms an intensity distribution of the position detection lights 80 within the detection space 70.

Figure 5:
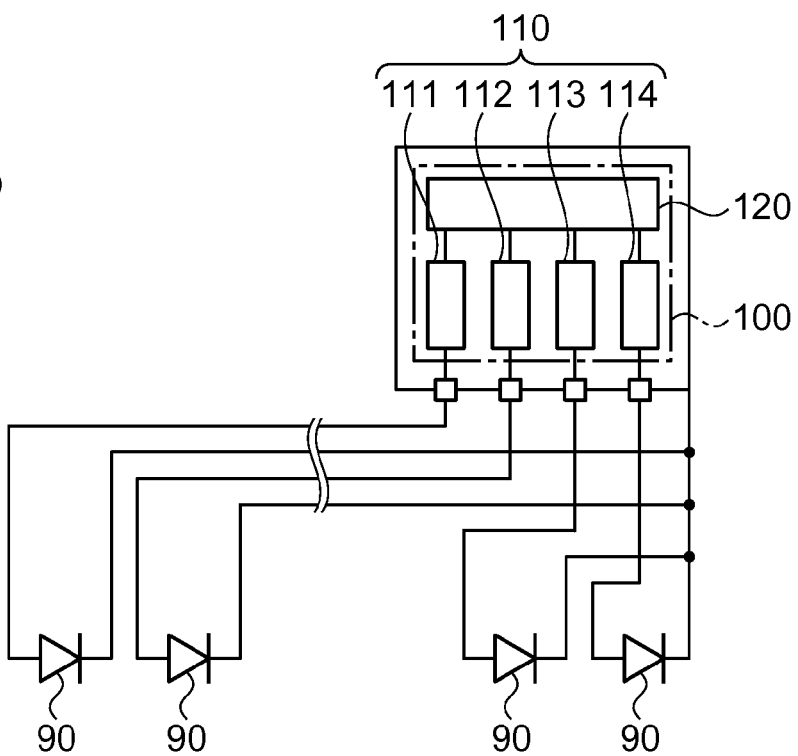
FIG. 5 is a circuit diagram showing a circuit configuration of a light source drive unit.
Figure 6:
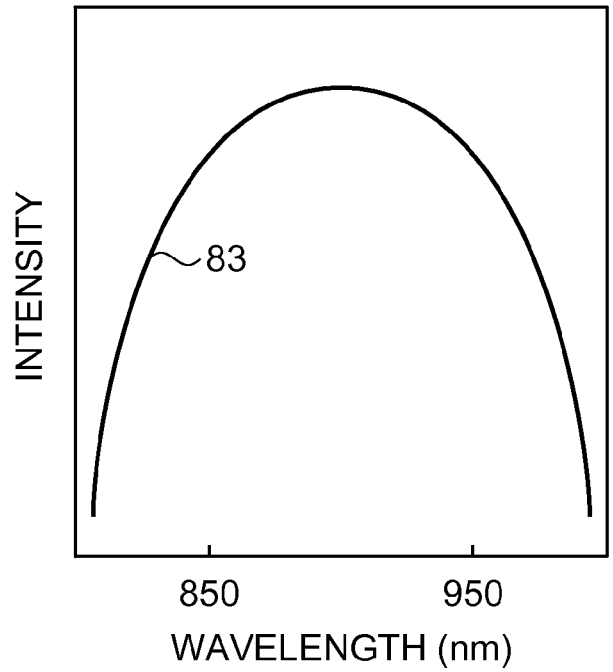
FIG. 6 is a distribution graph showing a frequency distribution of lights output by the light output unit.

FIG. 5 is a circuit diagram showing a circuit configuration of the light source drive unit. As shown in FIG. 5, the light source drive unit 100 includes a light source drive circuit 110 that drives the plural light emitting devices 90, and a light source control part 120 that respectively control the light emission intensity of the plural light emitting devices 90 via the light source drive circuit 110. Of them, the light source drive circuit 110 includes a first reflection light source drive circuit 111, a second reflection light source drive circuit 112, a third reflection light source drive circuit 113, and a fourth reflection light source drive circuit 114, for example, and they are electrically connected to the respective one light emitting device 90. Thereby, the position detection lights 80 are lights in a predetermined wavelength range. FIG. 6 is a distribution graph showing a frequency distribution of lights output by the light output unit. In FIG. 6, a position detection light distribution line 83 shows an example of the distribution of the wavelengths of the position detection lights 80. As shown by the position detection light distribution line 83, for example, the position detection lights 80 are lights in the wavelength range from about 800 nm to 1000 nm. Note that the position detection lights 80 have one peak intensity in the wavelength range equal to or less than 900 nm.

Figure 7:
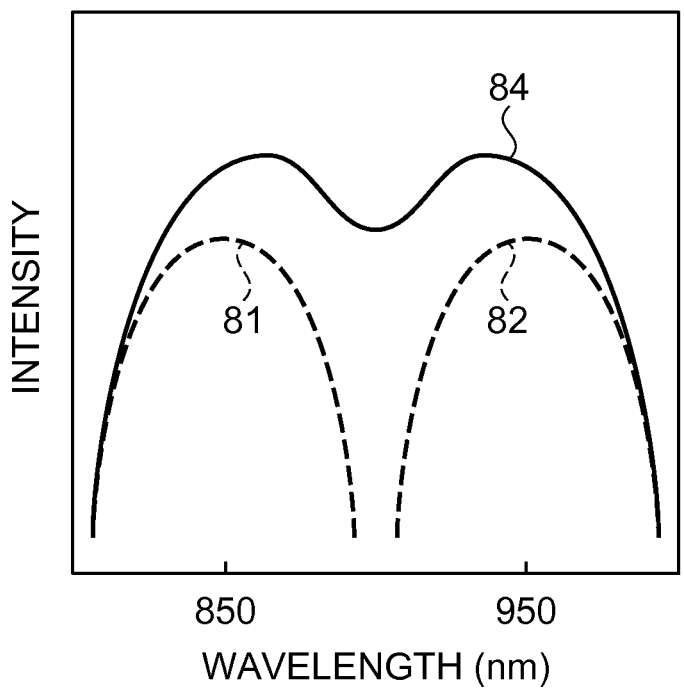
FIG. 7 is a distribution graph showing a frequency distribution of lights output by the light output unit.

Further, FIG. 7 is a distribution graph showing a frequency distribution of lights output by the light output unit. In FIG. 7, a position detection light distribution line 84 shows an example of the distribution of the wavelengths of the position detection lights 80. As shown by the position detection light distribution line 84, the frequency distribution of the position detection lights 80 may be the position detection light distribution line 84 obtained by synchronization of two infrared light distribution lines 81, 82 having different wavelength ranges from each other. For example, one infrared light distribution line 81 shows a distribution of lights in a wavelength range from about 800 nm to about 900 nm, and the other infrared light distribution line 82 shows a distribution of lights in a wavelength range from about 900 nm to about 1000 nm. Accordingly, the entire wavelength range is from about 800 nm to about 1000 nm, and has respective peak intensity in different wavelength ranges.

Thereby, compared to the case where the position detection lights are formed from one of the infrared light distribution line 81 and the infrared light distribution line 82, in the position detection lights 80 of the position detection light distribution line 84, the wavelength range of the position detection lights may be made wider and the light intensity may be sufficiently provided in the separate wavelength ranges from each other. The position detection lights 80 may be generated by providing respective plural first light emitting devices like LEDs that output the infrared light distribution line 81 and second light emitting devices like LEDs that output the infrared light distribution line 82 in the light output unit 20 of the position detection system and lighting them at the same time. Note that the position detection lights 80 may be generated using three or more kinds of light emitting devices having respective different wavelength ranges.

Figure 8:
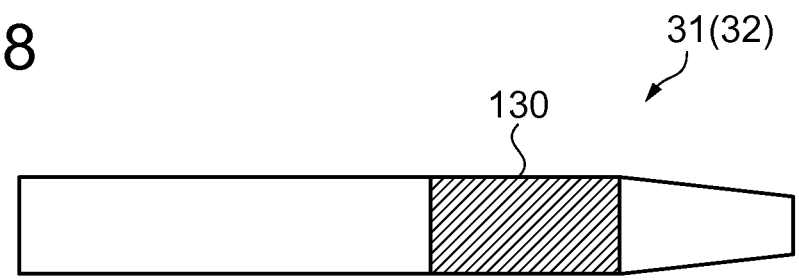
FIG. 8 is a schematic diagram showing a structure of a detection target.

FIG. 8 is a schematic diagram showing a structure of the detection target. As shown in FIG. 8, the first detection target 31 and the second detection target 32 are respectively pen-shaped. Further, retroreflectors 130 are provided on the first detection target 31 and the second detection target 32. The retroreflectors 130 may be provided on the surfaces of the first detection target 31 and the second detection target 32, and provided to cover the whole bodies. They are necessary to be provided in locations irradiated with the position detection lights 80.

Figure 9:
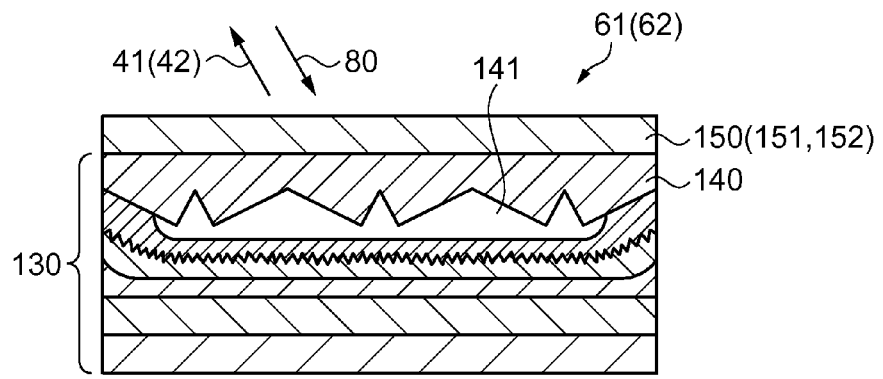
FIG. 9 is a schematic sectional view showing a basic configuration example of a retroreflector.

FIG. 9 is a schematic sectional view showing a basic configuration example of the retroreflector. As shown in FIG. 9, the retroreflector 130 includes a retroreflection element layer 140 and a surface protective layer with frequency filter 150 as a frequency filter is provided on one surface of the retroreflection element layer 140. The surface on which the surface protective layer with frequency filter 150 is provided is a surface that the position detection lights 80 enter. The surface protective layer with frequency filter 150 provided in the first reflection filter 61 is referred to as "first frequency filter 151" and the surface protective layer with frequency filter 150 provided in the second reflection filter 62 is referred to as "second frequency filter 152". The first frequency filter 151 and the second frequency filter 152 have different frequency characteristics.

The surface protective layer with frequency filter 150 is provided on the surface of the retroreflector 130 by coating or bonding. Thereby, there is no air layer between the surface protective layer with frequency filter 150 and the retroreflector 130, and the lights from the light output unit are not deteriorated by interface reflection. As a result, the individual differences in reflectance due to manufacturing variations of the detection targets may be made smaller.

In the retroreflection element layer 140, a hollow portion 141 is provided at the opposite side to the surface protective layer with frequency filter 150. Further, the lights are reflected by the difference in refractive index between the retroreflection element layer 140 and the hollow portion 141.

Figure 10A:
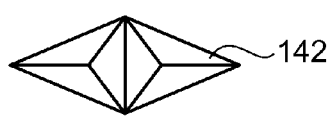
FIGS. 10A to 10H are schematic diagrams showing examples of shapes of retroreflection element layers.
Figure 10B:
Figure 10C:
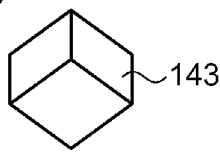
Figure 10D:

FIGS. 10A to 10H are schematic diagrams showing examples of shapes of the retroreflection element layers. FIG. 10A is a schematic plan view showing a retroreflection element layer of a first example, and FIG. 10B is a schematic sectional view showing the retroreflection element layer of the first example. As shown in FIGS. 10A and 10B, the retroreflection element layer 142 includes a retroreflection element having a triangular pyramid corner cube shape. FIG. 10C is a schematic plan view showing a retroreflection element layer of a second example, and FIG. 10D is a schematic sectional view showing the retroreflection element layer of the second example. As shown in FIGS. 10C and 10D, the retroreflection element layer 143 includes a retroreflection element having a hexagonal prism shape.

Figure 10E:
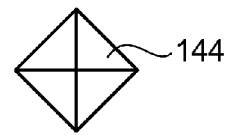
Figure 10F:
Figure 10G:
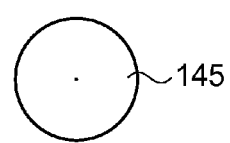
Figure 10H:
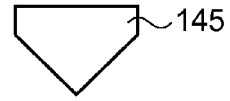

FIG. 10E is a schematic plan view showing a retroreflection element layer of a third example, and FIG. 10F is a schematic sectional view showing the retroreflection element layer of the third example. As shown in FIGS. 10E and 10F, the retroreflection element layer 144 includes a retroreflection element having a triangular pyramid corner cube shape. FIG. 10G is a schematic plan view showing a retroreflection element layer of a fourth example, and FIG. 10H is a schematic sectional view showing the retroreflection element layer of the fourth example. As shown in FIGS. 10G and 10H, the retroreflection element layer 145 includes a retroreflection element having a hexagonal prism shape. The retroreflection element layer 142 to the retroreflection element layer 145 have properties of reflecting incident light in parallel in the opposite direction by these shapes.

This retroreflector 130 provided on the first detection target 31 is provided with the first frequency filter 151 and the retroreflector 130 provided on the second detection target 32 is provided with the second frequency filter 152, and the first frequency filter 151 and the second frequency filter 152 have different reflection characteristics from each other.

It is preferable that the angle formed by the line connecting the light output unit 20 and the first detection target 31 and the line connecting the photodetector 30 and the first detection target 31 is 10 degrees or less. Similarly, it is preferable that the angle formed by the line connecting the light output unit 20 and the second detection target 32 and the line connecting the photodetector 30 and the second detection target 32 is 10 degrees or less. Since the retroreflectors 130 have the properties of reflecting incident light in parallel in the opposite direction, if the angles formed by the lines connecting the light output unit 20 and the first detection target 31 and the second detection target 32 and the lines connecting the photodetector 30 and the first detection target 31 and the second detection target 32 are 10 degrees or more, the amount of light received by the photodetector 30 becomes smaller and insufficient for position detection. By providing the photodetector 30 in the location where the reflected lights can be received, the photodetector 30 may efficiently receive the lights formed by reflection of the lights from the light output unit 20 by the first detection target 31 and the second detection target 32 in parallel in the opposite direction to the incident light.

Figure 11A:
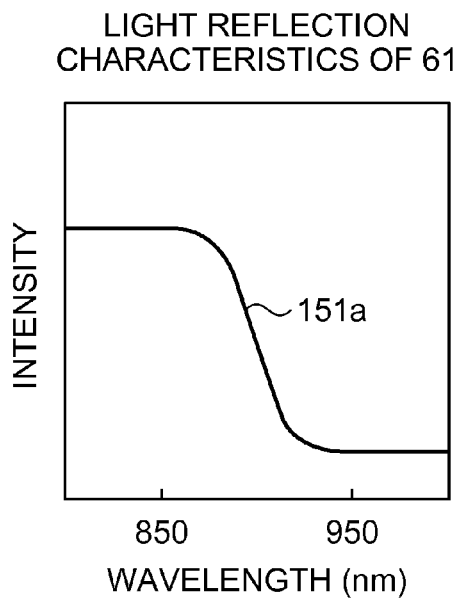
FIG. 11A shows reflection characteristics of a retroreflector of a first reflection filter.
Figure 11B:
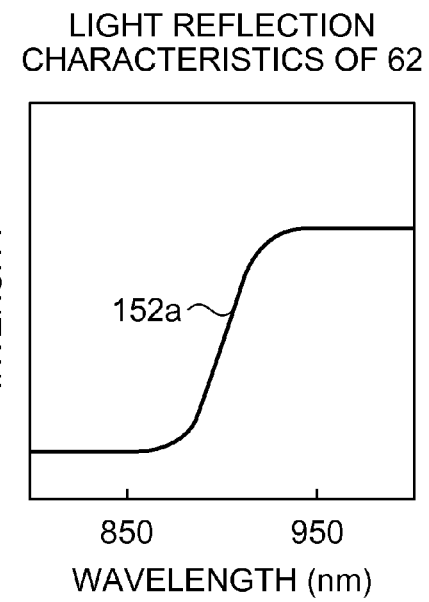
FIG. 11B shows reflection characteristics of a retroreflector of a second reflection filter.

FIG. 11A shows reflection characteristics of the retroreflector of the first reflection filter, and FIG. 11B shows reflection characteristics of the retroreflector of the second reflection filter. In FIG. 11A, a first frequency characteristic line 151a shows filter characteristics of the first frequency filter 151. As shown by the first frequency characteristic line 151a, specifically, the first frequency filter 151 has reflection characteristics such that the reflectance of the wavelength range from about 800 nm to about 900 nm (the first wavelength range) is higher than the reflectance of the wavelength range from about 900 nm to about 1000 nm (the second wavelength range).

On the other hand, in FIG. 11B, a second frequency characteristic line 152a shows filter characteristics of the second frequency filter 152. As shown by the second frequency characteristic line 152a, specifically, the second frequency filter 152 has reflection characteristics such that the reflectance of the wavelength range from about 900 nm to about 1000 nm is higher than the reflectance of the wavelength range from about 800 nm to about 900 nm.

Figure 12A:
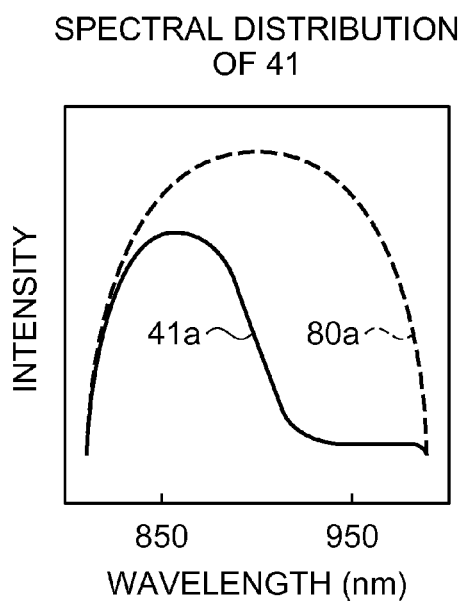
FIG. 12A shows a frequency distribution of a first reflected light.
Figure 12B:
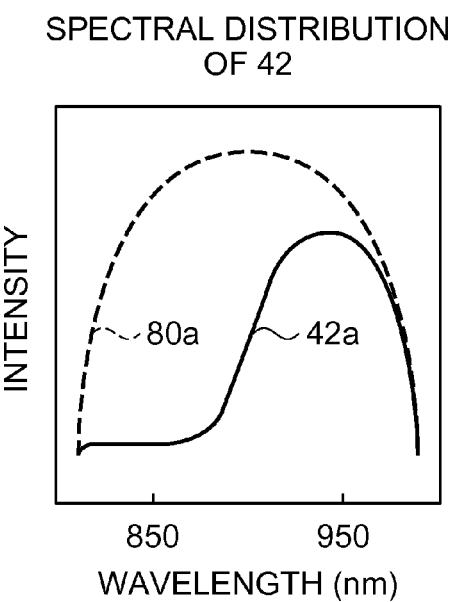
FIG. 12B shows a frequency distribution of a second reflected light.

FIG. 12A shows a frequency distribution of the first reflected light, and FIG. 12B shows a frequency distribution of the second reflected light. A position detection light distribution line 80a shows a frequency distribution of the position detection lights 80. A first reflected light distribution line 41a shows a frequency distribution of the first reflected lights 41, and a second reflected light distribution line 41a shows a frequency distribution of the second reflected lights 42. As shown in FIG. 12A, when the position detection lights 80 enter the first frequency filter 151, the light components of the position detection lights 80 in the wavelength range from about 900 nm to about 1000 nm are absorbed by the first frequency filter 151, and the light components of the position detection lights 80 in the wavelength range from about 800 nm to about 900 nm are reflected by the retroreflector 130 and output as the first reflected lights 41.

As shown in FIG. 12B, when the position detection lights 80 enter the second frequency filter 152, the light components of the position detection lights 80 in the wavelength range from about 800 nm to about 900 nm are absorbed by the second frequency filter 152, and the light components of the position detection lights 80 in the wavelength range from about 900 nm to about 1000 nm are reflected by the retroreflector 130 and output as the second reflected lights 42. Therefore, the first reflected lights 41 of the first detection target 31 and the second reflected lights 42 of the second detection target 32 have different wavelength distributions from each other.

Configuration of Position Detection Unit

Figure 13:
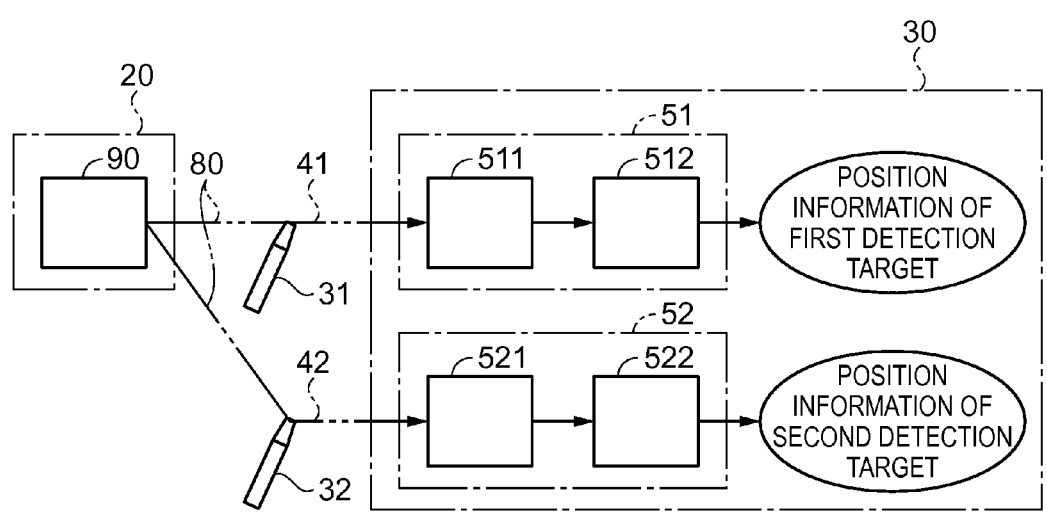
FIG. 13 is a block diagram showing a configuration of a position detection unit.

As shown in FIGS. 1 to 3, in the photodetector 30, the first light receiving unit 51 (first light detection unit) and the second light receiving unit 52 (second light detection unit) are provided within the same casing. FIG. 13 is a block diagram showing a configuration of the position detection unit. As shown in FIG. 13, a first reflected light detection part 511 is provided in the first light receiving unit 51 and a second reflected light detection part 521 is provided in the second light receiving unit 52. In the photodetector 30, a first position detection part 512 that obtains position information based on a detection value of the first reflected light detection part 511 and a second position detection part 522 that obtains position information based on a detection value of the second reflected light detection part 521 are provided.

These first reflected light detection part 511 and second reflected light detection part 521 have different sensitivity characteristics from each other. Specifically, the first reflected light detection part 511 has sensitivity characteristics such that the detection sensitivity of the wavelength range from about 800 nm to about 900 nm is higher than the detection sensitivity of the wavelength range from about 900 nm to about 1000 nm. Thereby, the influence of the second reflected light 42 on the detection value of the first reflected light detection part 511 may be made smaller and the detection value reflecting the intensity of the first reflected light 41 may be obtained. The first reflected light detection part 511 is electrically connected to the first position detection part 512, and the detection value of the first reflected light detection part 511 is output to the first position detection part 512.

On the other hand, the second reflected light detection part 521 has sensitivity characteristics such that the detection sensitivity of the wavelength range from about 900 nm to about 1000 nm is higher than the detection sensitivity of the wavelength range from about 800 nm to about 900 nm. Thereby, the influence of the first reflected light 41 on the detection value of the second reflected light detection part 521 may be made smaller and the detection value reflecting the intensity of the second reflected light 42 may be obtained. The second reflected light detection part 521 is electrically connected to the second position detection part 522, and the detection value of the second reflected light detection part 521 is output to the second position detection part 522.

Therefore, the first position detection part 512 of the first light receiving unit 51 may detect the position of the first detection target 31 in the detection space 70 using the detection value of the first reflected light detection part 511 detecting the first reflected light 41 and the intensity distribution of the position detection lights 80. Further, the second position detection part 522 of the second light receiving unit 52 may detect the position of the second detection target 32 in the detection space 70 using the detection value of the second reflected light detection part 521 detecting the second reflected light 42 and the intensity distribution of the position detection lights 80.

Basic Principle of Coordinate Detection

In the optical position detection system of the embodiment, the intensity distribution of the position detection lights 80 is formed along the reference surface 10 in the detection space 70 by lighting the plural light emitting devices 90 of the light output unit 20. Under the condition, the first reflected light 41 reflected by the retroreflector 130 of the first detection target 31 is detected by the first reflected light detection part 511 and the position of the first detection target 31 in the detection space 70 is detected by the first position detection part 512 based on the result. Further, the second reflected light 42 reflected by the retroreflector 130 of the second detection target 32 is detected by the second reflected light detection part 521 and the position of the second detection target 32 in the detection space 70 is detected by the second position detection part 522 based on the result. As below, the configuration of the light intensity distribution and the principle of coordinate detection of the first detection target 31 will be explained with reference to FIGS. 14A to 14C. Note that the coordinate detection principle of the second detection target 32 is the same as the principle of the coordinate detection of the first detection target 31, and the explanation will be omitted.

Figure 14A:
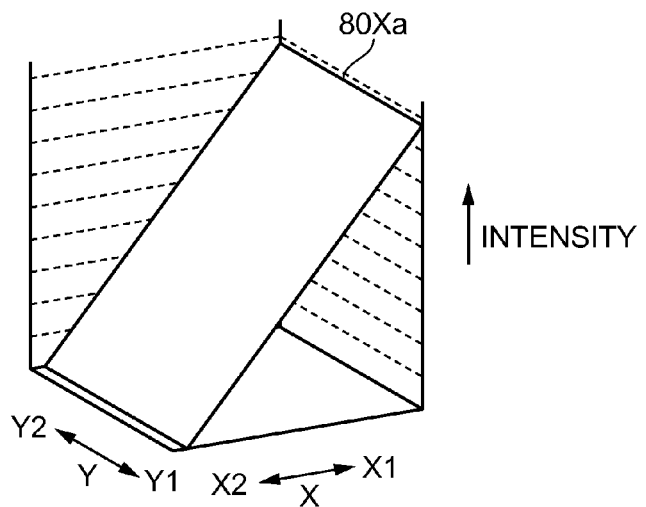
FIGS. 14A to 14C are schematic diagrams for explanation of intensity distributions of position detection lights and processing in the position detection unit.
Figure 14B:
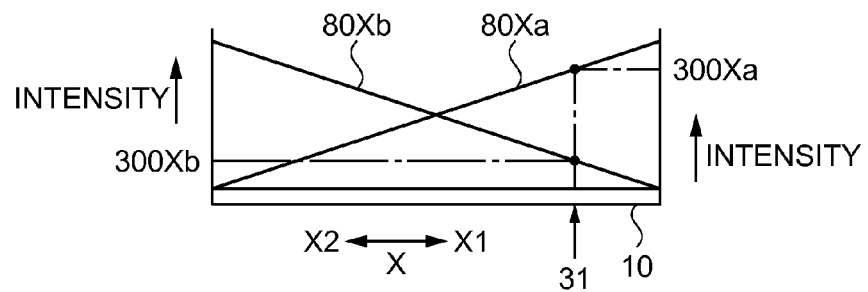
Figure 14C:
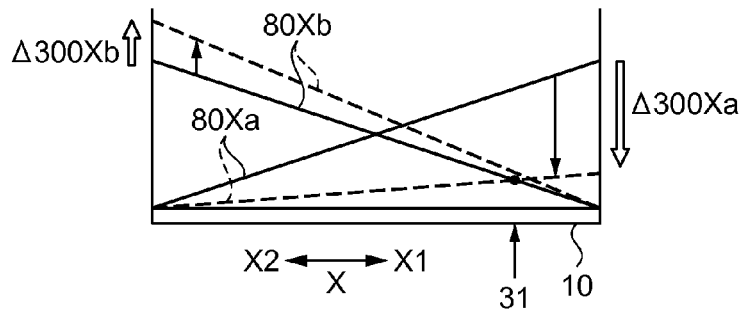

FIGS. 14A to 14C are schematic diagrams for explanation of intensity distributions of position detection lights and processing in the position detection unit. FIG. 14A is a diagram for explanation of an intensity distribution of the position detection lights in the X-axis direction, FIG. 14B is a diagram for explanation of intensity of reflected lights reflected by the first detection target, and FIG. 14C is a diagram for explanation of adjustment of the intensity distribution of the position detection lights so that the intensity of the reflected lights reflected by the first detection target are equal.

When the position detection lights 80 are output from the light output unit 20, the intensity distribution of the position detection lights 80 is formed along the reference surface 10 in the detection space 70 according to the lighting pattern of the plural light emitting devices 90. For example, when the X-coordinate is detected, as shown in FIG. 14A and FIG. 14B, first, a first intensity distribution for X-coordinate detection 80Xa in which intensity gradually decreases from one side X1 toward the other side X2 in the X-axis direction is formed in a first period, and then, a second intensity distribution for X-coordinate detection 80Xb in which the intensity gradually decreases from the other side X2 toward the one side X1 in the X-axis direction is formed in a second period.

Here, as shown in the example, it is preferable that the first intensity distribution for X-coordinate detection 80Xa in which the intensity linearly decreases from the one side X1 toward the other side X2 in the X-axis direction is formed in the first period, and the second intensity distribution for X-coordinate detection 80Xb in which the intensity linearly decreases from the other side X2 toward the one side X1 in the X-axis direction is formed in the second period.

Under the condition, when the first detection target 31 is placed in the detection space 70, the position detection light 80 is reflected by the retroreflector 130 of the first detection target 31 and modulated into the first reflected light 41, and a part of the first reflected light 41 is detected by the first reflected light detection part 511 of the photodetector 30. In this regard, if the first intensity distribution for X-coordinate detection 80Xa and the second intensity distribution for X-coordinate detection 80Xb are set in advance, the X-coordinate of the first detection target 31 may be detected by the following method or the like.

As shown in FIG. 14B, the first method is a method of using the difference between the first intensity distribution for X-coordinate detection 80Xa and the second intensity distribution for X-coordinate detection 80Xb. Specifically, the first intensity distribution for X-coordinate detection 80Xa and the second intensity distribution for X-coordinate detection 80Xb are adapted to have predetermined distribution forms set in advance, and the difference between the first intensity distribution for X-coordinate detection 80Xa and the second intensity distribution for X-coordinate detection 80Xb is also a function of the X-coordinate in the form set in advance. Therefore, by obtaining the difference between a detection value 300Xa in the first reflected light detection part 511 when the first intensity distribution for X-coordinate detection 80Xa is formed in the first period and a detection value 300Xb in the first reflected light detection part 511 when the second intensity distribution for X-coordinate detection 80Xb is formed in the second period, the X-coordinate of the first detection target 31 may be detected. Note that the ratio between the detection values 300Xa and 300Xb is also a function of the X-coordinate, and the X-coordinate can be detected by obtaining the ratio.

The second method is a method of using an amount of adjustment when the drive currents of the plural light emitting devices 90 are adjusted so that the detection value 300Xa in the first intensity distribution for X-coordinate detection 80Xa and the detection value 300Xb in the second intensity distribution for X-coordinate detection 80Xb may be equal. Note that the second method may be applied to the case where the first intensity distribution for X-coordinate detection 80Xa and the second intensity distribution for X-coordinate detection 80Xb linearly change with respect to the X-coordinate as shown in FIG. 14B.

As shown in FIG. 14B, first, in the first period and the second period, the first intensity distribution for X-coordinate detection 80Xa and the second intensity distribution for X-coordinate detection 80Xb are formed to have equal absolute values in opposite directions along the X-axis. Under the condition, if the detection value 300Xa in the first intensity distribution for X-coordinate detection 80Xa and the detection value 300Xb in the second intensity distribution for X-coordinate detection 80Xb are equal, it is known that the first detection target 31 is located at the center in the X-axis direction.

On the other hand, as shown in FIG. 14C, when the detection value 300Xa and the detection value 300Xb are different, the drive currents for the plural light emitting devices 90 are adjusted in both or one of the first period and the second period to make them equal, and, again, the first intensity distribution for X-coordinate detection 80Xa is formed in the first period and the second intensity distribution for X-coordinate detection 80Xb in the second period. As a result, if the detection value 300Xa and the detection value 300Xb become equal, the X-coordinate of the first detection target 31 may be detected from the ratio, the difference, or the like between an amount of adjustment A300Xa in the first period and an amount of adjustment A300Xb in the second period. Alternatively, the X-coordinate of the first detection target 31 may be detected from the ratio, the difference, or the like between an amount of control with respect to the plural light emitting devices 90 in the first period after adjustment and an amount of control with respect to the plural light emitting devices 90 in the second period after adjustment.

In either case where the first method or the second method is employed, similarly, a first intensity distribution for Y-coordinate detection in which intensity gradually decreases from one side toward the other side in the Y-axis direction is formed in a third period. Then, a second intensity distribution for Y-coordinate detection in which the intensity gradually decreases from the other side toward the one side in the Y-axis direction is formed in a fourth period. Thereby, the Y-coordinate of the first detection target 31 may be detected. Further, if an intensity distribution in the Z-axis direction is formed in a fifth period, the Z-coordinate of the first detection target 31 may be detected. Here, in the fifth period, for example, all of the light emitting devices 90 of the light output unit 20 are driven in the same amount of light emission, and thereby, an intensity distribution in which the intensity is nearly constant in the X-axis and Y-axis directions, but the intensity changes in the Z-axis direction may be formed. Note that the X-coordinate, the Y-coordinate, and the Z-coordinate of the second detection target 32 may respectively be detected using the first method and the second method in the same manner.

Further, in either method of the first method and the second method, even if an infrared component contained in environment light enters the first reflected light detection part 511, when the difference between the detection values 300Xa and 300Xb is obtained or the detection values 300Xa and 300Xb are adjusted to be equal, the intensity of the environment light is cancelled out, and thus, the environment light has no influence on the detection accuracy of the first detection target 31. Even if the environment light enters the second reflected light detection part 521, similarly, it has no influence on the detection accuracy of the second detection target 32.

As described above, the position information of the first detection target 31 in the detection space 70 is acquired based on the detection result of the first reflected light detection part 511. Further, the position information of the second detection target 32 in the detection space 70 is acquired based on the detection result of the second reflected light detection part 521. In this regard, for example, a configuration of using micro processing units (MPUs) respectively for the first position detection part 512 and the second position detection part 522 and performing processing according to execution of predetermined software (operation program) may be employed. Further, as will be explained with reference to FIG. 15, a configuration of performing processing by a signal processing unit using hardware such as a logic circuit may be employed.

Figure 15:
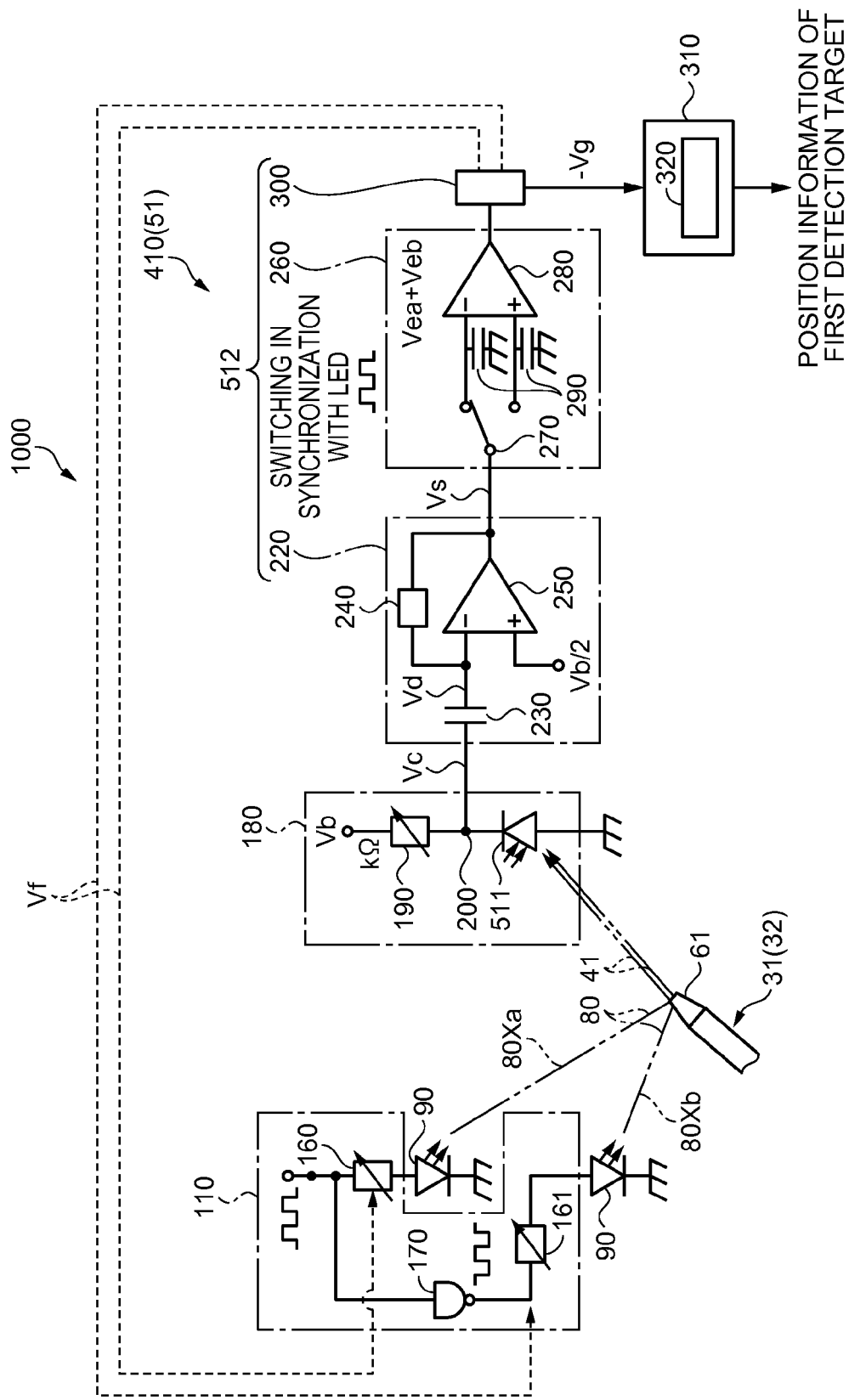
FIG. 15 is a schematic circuit diagram showing an example of a signal processing circuit of a first position detection part.

FIG. 15 is a schematic circuit diagram showing an example of a signal processing circuit of the first position detection part. The first position detection part 512 shown here realizes the first method in the above described basic principle of coordinate detection. That is, the difference between the detection value 300Xa in the first reflected light detection part 511 in the first period and the detection value 300Xb in the first reflected light detection part 511 in the second period is calculated. Then, the calculated difference value is checked against the preset function value of the difference between the first intensity distribution for X-coordinate detection 80Xa and the second intensity distribution for X-coordinate detection 80Xb, and thereby, the X-coordinate of the first detection target 31 is detected. Note that the configurations for respectively detecting the X-coordinate, the Y-coordinate, and the Z-coordinate of the first detection target 31 are the same, and only the case of obtaining the X-coordinate of the first detection target 31 will be described in the following explanation. Further, the second reflected light detection part 521 and the second position detection part 522 of the second light receiving unit 52 for detection of the X-coordinate, the Y-coordinate, and the Z-coordinate of the second detection target 32 shown in FIG. 13 are respectively the same as the first reflected light detection part 511 and the first position detection part 512 of the first light receiving unit 51, and their explanation will be omitted.

As shown in FIG. 15, the light source drive circuit 110 in the position detection system 1000 of the embodiment is shown to apply drive pulse having a predetermined current value to the plural light emitting devices 90 via a variable resister 160 in the first period, and apply drive pulse having a predetermined current value to the plural light emitting devices 90 via a variable resister 161 and an inverting circuit 170 in the second period. Therefore, the light source drive circuit 110 applies drive pulse in the opposite phases to the plural light emitting devices 90 in the first period and the second period.

Further, the position detection lights 80 when forming the first intensity distribution for X-coordinate detection 80Xa in the first period are reflected by the retroreflector 130 of the first detection target 31 and modulated into the first reflected lights 41, and the first reflected lights 41 are received by the first reflected light detection part 511. Similarly, the position detection lights when forming the second intensity distribution for X-coordinate detection 80Xb in the second period are reflected by the retroreflector 130 of the first detection target 31 and modulated into the first reflected lights 41, and the first reflected lights 41 are received by the first reflected light detection part 511. The first reflected light detection part 511 is provided in a light intensity signal generation circuit 180, and a resister 190 of about 1 kΩ is electrically series-connected and a bias voltage Vb is applied to their ends.

In the light intensity signal generation circuit 180, the first position detection part 512 is electrically connected to a connection point 200 between the first reflected light detection part 511 and the resister 190. A detection signal Vc output from the connection point 200 is an alternating-current signal in response to the pulse signal having a level and an amplitude reflecting the light intensity received by the first reflected light detection part 511.

The first position detection part 512 is connected to the output of the light intensity signal generation circuit 180. The first position detection part 512 has a signal extraction circuit 220 that extracts a light detection signal, a signal extraction circuit 260 that separates signals in the first period and the second period from the light detection signal, and a signal processing circuit 300 that forms a signal relating to the position information based on the separated signals.

The signal extraction circuit 220 includes a filter 230 having a capacitor of about 1 nF, and the filter 230 functions as a high-pass filter that removes a direct-current component from the signal output from the connection point 200 between the first reflected light detection part 511 and the resister 190. Accordingly, from the detection signal Vc output from the connection point 200 by the filter 230, a position detection signal Vd as an alternating-current component of the voltage Vc is extracted. That is, while the position detection lights 80 are modulated, the environment light may be regarded constant in intensity within a certain period. Thus, the lower frequency components or the direct-current components due to the environment light are removed by the filter 230.

Further, the signal extraction circuit 220 has an adder circuit 250 including a feedback resister 240 of about 220 kΩ at the downstream of the filter 230. The position detection signal Vd extracted by the filter 230 is output to the signal extraction circuit 260 as a position detection signal Vs formed by superimposition on the voltage V/2 as a half of the bias voltage Vb.

The signal extraction circuit 260 includes a switch 270 that performs switching operation in synchronization with the drive pulse applied to the light emitting devices 90 in the first period, a comparator 280, and capacitors 290 respectively electrically connected to input lines of the comparator 280. Accordingly, when the position detection signal Vs is input to the signal extraction circuit 260, an effective value Vea of the position detection signal Vs in the first period and an effective value Veb of the position detection signal Vs in the second period are alternately output from the signal extraction circuit 260 to the signal processing circuit 300.

The signal processing circuit 300 obtains a difference between the effective value Vea in the first period and the effective value Veb in the second period, and outputs the difference to a position determination unit 310 as a position detection signal Vg. In a memory part 320 of the position determination unit 310, function values of the difference between the first intensity distribution for X-coordinate detection 80Xa and the second intensity distribution for X-coordinate detection 80Xb along the X-axis direction in the detection space 70 are held and the corresponding X-coordinate is determined by checking the position detection signal Vg against the function value, and thereby, the X-coordinate of the first detection target 31 may be obtained.

Note that the second method in the above described basic principle of coordinate detection detects the X-coordinate of the first detection target 31 based on the amount of adjustment when the amounts of control (drive currents) of the plural light emitting devices 90 are adjusted so that the detection values 300Xa and 300Xb in the first reflected light detection part 511 in the first period and the second period may be equal. As shown by broken lines in FIG. 15, a control signal Vf is output from the signal processing circuit 300 of the first light receiving unit 51 to the light source drive circuit 110 of the position detection system 1000 so that the effective value yea of the position detection signal Vs in the first period and the effective value Veb of the position detection signal Vs in the second period may be at the same level. In this case, the effective value Vea in the first period and the effective value Veb in the second period are compared, and, if they are equal, the present drive condition is maintained. On the other hand, if the effective value Vea in the first period is lower than the effective value Veb in the second period, the resistance value of the variable resister 160 is made lower and the amount of output lights from the light emitting diodes 90 in the first period is made higher. Further, if the effective value Veb in the second period is lower than the effective value Vea in the first period, the resistance value of the variable resister 161 is made lower and the amount of output lights in the second period is made higher. Then, the amount of adjustment when the effective values Vea and Veb are finally at the same level is used for calculation of the position information.

As described above, there are the following advantages according to the embodiment.

(1) In the embodiment, the first frequency filter 151 and the second frequency filter 152 having different reflection characteristics from each other are provided in the first detection target 31 and the second detection target 32, respectively. Further, the retroreflectors 130 that strongly reflect incident light in parallel in the opposite direction are provided and the first reflected light detection part 511 and the second reflected light detection part 521 having different sensitivity characteristics from each other are respectively provided in the photodetector 30. Thereby, the detection value of the first reflected light detection part 511 reflects the reflected light (first reflected light 41) of the first frequency filter 151, but the influence of the reflected light (second reflected light 42) of the second frequency filter 152 is suppressed. Further, the detection value of the second reflected light detection part 521 reflects the reflected light (second reflected light 42) of the second frequency filter 152, but the influence of the reflected light (first reflected light 41) of the first frequency filter 151 is suppressed. Two reflected lights may respectively return strong reflected lights to the detector, and thus, the reflected lights of the first detection target 31 and the second detection target 32 may be distinguished without mixing up and accurately detected. Therefore, the positions of the first detection target 31 and the second detection target 32 in the detection space 70 may respectively be detected.

(2) The first frequency filter 151 and the second frequency filter 152 are provided at the ends of the first detection target 31 and the second detection target 32, respectively. Further, the first frequency filter 151 passes the first reflected light 41 and the second frequency filter 152 passes the second reflected light 42. The first light receiving unit 51 detects the first reflected light 41 and the second light receiving unit 52 detects the second reflected light 42. Therefore, the first light receiving unit 51 may detect the position of the first detection target 31 and the second light receiving unit 52 may detect the position of the second detection target 32. Furthermore, the retroreflectors 130 reflect the reflected lights in predetermined directions, and thereby, the reflected lights for detection of the positions may efficiently be received. Therefore, the positions of the plural detection targets may accurately be detected.

(3) In the embodiment, the retroreflector 130 has the prism shape. In this regard, the prism shape may efficiently and reliably bring incident light into reflected light in parallel in the opposite direction.

(4) In the embodiment, the surface protective layer with frequency filter 150 is provided by coating or bonding on the surface of the retroreflector 130. There is no air layer between the surface protective layer with frequency filter 150 and the retroreflector 130, and the lights from the light output unit 20 are not deteriorated by interface reflection. As a result, the individual differences in reflectance due to manufacturing variations of the detection targets may be made smaller.

(5) In the embodiment, the first light receiving unit 51 and the second light receiving unit 52 are provided in one photodetector 30. Accordingly, compared to the case where they are separately provided, the number of parts may be reduced. Furthermore, adjustment of the directions in which the first light receiving unit 51 and the second light receiving unit receive lights may be made easier. Therefore, the difference in directionality between the light receiving units may be reduced and the influence on position information by the displacement of the detection positions may be reduced. As a result, the relative positions of the respective detection targets may accurately be detected without complicated processing.

(6) In the embodiment, the angle formed by the line connecting the light output unit 20 and the first detection target 31 and the line connecting the photodetector 30 and the first detection target 31 is 10 degrees or less. Further, the angle formed by the line connecting the light output unit 20 and the second detection target 32 and the line connecting the photodetector 30 and the second detection target 32 is 10 degrees or less. Since the retroreflectors 130 have the properties of reflecting incident light in parallel in the opposite direction, if the angles formed by the lines connecting the light output unit 20 and the first detection target 31 and the second detection target 32 and the lines connecting the photodetector 30 and the first detection target 31 and the second detection target 32 are more than 10 degrees, the amount of lights received by the photodetector 30 becomes smaller and insufficient for position detection. In the embodiment, the photodetector 30 is provided in the location where the reflected lights can be received. Therefore, the photodetector may efficiently receive the lights formed by reflection of the lights from the light output unit 20 by the first detection target 31 and the second detection target 32.

(7) In the embodiment, the reflected lights from the first detection target 31 and the second detection target 32 may be made stronger by the retroreflectors 130. Therefore, even in the case where the display area is wider as in a projection display apparatus (projector), the positions can optically be detected.

(8) In the embodiment, for detection of coordinates of the first detection target 31 and the second detection target 32, the first method in the basic principle of coordinate detection, i.e., a method using difference between two kinds of intensity distributions of the position detection lights 80 may be used. The second method is the method using the amount of adjustment when the drive currents of the plural light emitting devices 90 are adjusted so that the detection values in the two kinds of intensity distributions may be equal. In this regard, compared to the second method, in the first method, it is not necessary to adjust the drive currents of the plural light emitting devices 90 with respect to each of the first detection target 31 and the second detection target 32. Accordingly, the positions of the first detection target 31 and the second detection target 32 may be detected in parallel at the same time. Therefore, time-sharing processing or the like is not necessary and the position information of the plural detection targets can be obtained at arbitrary times, and thus, plural detection targets can be distinguished using a simple configuration.

(9) In the embodiment, the projection display system 1100 includes the image irradiation system 1200 that projects an image on the reference surface 10. Therefore, the image projected on the reference surface 10 may be viewed. Further, the projection display system 1100 includes the position detection system 1000. Therefore, a system combining an image and a function of detecting the first detection target 31 and the second detection target 32 may be constructed. In this case, the light output unit 20 may be provided in the image irradiation system 1200, or separately from the image irradiation system 1200.

The invention is not limited to the above described illustrated examples, but various changes may obviously be made without departing from the scope of the invention.

Modified Example 1

In the embodiment, the first frequency filter 151 and the second frequency filter 152 having different reflection characteristics from each other have been provided on the surfaces of the first detection target 31 and the second detection target 32, respectively. The different reflection characteristics from each other may be provided not by providing the first frequency filter 151 and the second frequency filter 152, but by forming constituent materials exposed on the surfaces of the first detection target 31 and the second detection target 32 using different materials.

Modified Example 2

In the embodiment, the first detection target 31 and the second detection target 32 and the corresponding first reflected light detection part 511 and second reflected light detection part 521 have been provided. Further, the positions of the first detection target 31 and the second detection target 32 have been respectively detected using different wavelength ranges from each other. Not limited to the method, but three or more detection targets and three or more photodetectors are provided and the positions of the three or more detection targets may be respectively detected using three or more different wavelength ranges.

The embodiment has been explained in detail, and the person who skilled in the art could easily understood that many modifications may be made without substantially departing from the new matter and effects of the invention. Therefore, all of the modified examples are contained within the range of the invention. For example, in the specification and the drawings, the terms written with the broader or synonymous different terms at least once may be replaced by the different terms in any location of the specification and the drawings. Further, the configurations, operations of the optical position detection system and the projection display system may not be limited to those explained in the embodiment, but various modifications can be implemented.

The entire disclosure of Japanese Patent Application No. 2011-055185, filed Mar. 14, 2011 is expressly incorporated by reference herein.

What is claimed is:
1. A position detection system comprising:
  a light output unit that outputs lights toward a first detection target and a second detection target;
  a light receiving unit that receives lights reflected from the first detection target and the second detection target; and a position detection unit that detects positions of the first detection target and the second detection target using the lights received by the light receiving unit, wherein the first detection target has a first reflection filter that reflects a first reflected light and the second detection target has a second reflection filter that reflects a second reflected light having a different wavelength from that of the first reflected light, and the light receiving unit has a first light receiving unit that detects the first reflected light and a second light receiving unit that detects the second reflected light by distinguishing wavelengths of the lights.

2. The position detection system according to claim 1, wherein the first reflection filter and the second reflection filter each has a frequency filter and a retroreflector that reflects incident light in an opposite direction to an incident direction.

3. The position detection system according to claim 2, wherein the retroreflector has a prism shape.

4. The position detection system according to claim 2, wherein the frequency filter is provided by coating or bonding on a surface of the retroreflector.

5. The position detection system according to claim 2, wherein the first light receiving unit and the second light receiving unit are provided in one photodetector.

6. The position detection system according to claim 5, wherein an angle formed by a line connecting the light output unit and the first detection target and a line connecting the photodetector and the first detection target is 10 degrees or less, and an angle formed by a line connecting the light output unit and the second detection target and a line connecting the photodetector and the second detection target is 10 degrees or less.

7. A projection display system comprising:
the position detection system according to claim 1; and
an image irradiation system that projects an image on a reference surface.

8. A projection display system comprising:
the position detection system according to claim 2; and
an image irradiation system that projects an image on a reference surface.

9. A projection display system comprising:
the position detection system according to claim 3; and
an image irradiation system that projects an image on a reference surface.

10. A projection display system comprising:
the position detection system according to claim 4; and
an image irradiation system that projects an image on a reference surface.

11. A projection display system comprising:
the position detection system according to claim 5; and
an image irradiation system that projects an image on a reference surface.

12. A projection display system comprising:
the position detection system according to claim 6; and
an image irradiation system that projects an image on a reference surface.

* * * * *